United States Patent [19]
Ohira et al.

[11] Patent Number: 4,855,786
[45] Date of Patent: Aug. 8, 1989

[54] ELECTROPHOTOGRAPHIC COPYING MACHINE CAPABLE OF EDITING FUNCTION

[75] Inventors: Tadashi Ohira, Toyokawa; Masazumi Ito, Toyohashi; Syuzi Maruta, Toyokawa, all of Japan

[73] Assignee: Minolta Camera Kabushiki Kaisha, Osaka, Japan

[21] Appl. No.: 5,743

[22] Filed: Jan. 21, 1987

[30] Foreign Application Priority Data

Jan. 24, 1986 [JP] Japan .................................. 61-14176

[51] Int. Cl.[4] ...................... G03G 15/00; G03B 27/52
[52] U.S. Cl. ...................................... 355/218; 355/40
[58] Field of Search .............. 355/14 R, 14 C, 14 CU, 355/7, 8, 75, 40

[56] References Cited

U.S. PATENT DOCUMENTS

| | | | |
|---|---|---|---|
| 4,215,929 | 8/1980 | Sato et al. | 355/7 |
| 4,256,400 | 3/1981 | Komori et al. | 355/14 SH |
| 4,320,962 | 3/1982 | Takahashi et al. | 355/14 C |
| 4,417,805 | 11/1983 | Kishi | 355/14 R |
| 4,582,417 | 4/1986 | Yagasaki et al. | 355/7 |
| 4,627,707 | 12/1986 | Tani et al. | 355/14 R |
| 4,634,266 | 1/1987 | Migita et al. | 355/14 R X |
| 4,678,315 | 7/1987 | Watanabe | 355/14 R X |
| 4,687,317 | 8/1987 | Appel et al. | 355/7 X |
| 4,701,044 | 10/1987 | Horiuchi et al. | 355/7 |

FOREIGN PATENT DOCUMENTS

| | | | |
|---|---|---|---|
| 55952 | 5/1981 | Japan | 355/75 |
| 176065 | 9/1985 | Japan | 355/75 |
| 208747 | 10/1985 | Japan | 355/75 |
| 165769 | 7/1986 | Japan | 355/14 R |

*Primary Examiner*—A. T. Grimley
*Assistant Examiner*—Edward Pipala
*Attorney, Agent, or Firm*—Burns, Doane, Swecker & Mathis

[57] ABSTRACT

An electrophotographic copying machine capable of editing function comprising: a table for setting a document; scan means for scanning the document; first input means for providing first and second data to specify positions in the scanning direction; second input means for providing third and fourth data to specify positions in the direction perpendicular to the scanning direction; memory means for storing the provided data, which comprises a first memory area for storing smaller data provided by the first input means, a second memory area for storing larger data provided by the first input means, third memory area for storing smaller data provided by the second input means, and a fourth memory area for storing larger data provided by the second input means; a means for specifying an area on the basis of the data stored in the memory means; and copying means for reproducing a image of the document corresponding to the specified area.

17 Claims, 17 Drawing Sheets

ELECTROPHOTOGRAPHIC COPYING MACHINE CAPABLE OF EDITING FUNCTION

BACKGROUND OF THE INVENTION

1. Field of the Invention

The present invention relates to an electrophotographic copying machine and, more specifically, to a copying machine capable of so-called editing function, capable of reproducing only a specified area in document.

2. Discussion of the Background

There has been proposed an electrophotographic copying machine capable of copying only a specified area in a document on a copying paper, namely, a copying machine, for example U.S. Pat. No. 4,582,417 (Yagasaki et al.), capable of so-called editing function, which scans a document optically to form an electrostatic latent image on a photosensitive member, develops the electrostatic latent image with a toner, transfers the toner image to a copying paper, and fixes the toner image on the copying paper.

Such a conventional electrostatic copying machine is based on a principle of omitting the reproduction of an undesired area in a document by erasing electric charge in an area on the photosensitive member corresponding to the undesired area in a document prior to developing the electrostatic latent image so that the development of the electrostatic latent image of the undesired area is impossible.

It is one of the methods of specifying a certain area not to be copied or a certain area to be copied employed in such a copying machine capable of editing function to give orthogonal coordinates data, namely, numerical data, representing the certain area.

For example, when the certain area is a single rectangular area as illustrated in FIG. 8, the area is specified by giving the x-coordinates A and B, and the y-coordinates C and D of one end a (A,C) and the other end d (B,D) of a diagonal, or one end b (A,D) and the other end c (B,C) of the other diagonal. In the following description, it is assumed in FIG. 8 that the upper right-hand corner is the origin (0,0), positive values for X are measured to the left on the x-axis extending leftward, positive values for y are measured downward on the y-axis extending downward, and a copying paper is moved in the negative direction of the x-axis, namely rightward in FIG. 8.

Incidentally, the method of specifying an area by giving the x-coordinates A and B, and the y-coordinates C and D has a problem that an operator is liable to err in the order of input in giving the coordinates data.

Generally, the operator recognizes visually, namely, two-dimensionally, the area defined by four points a, b, c and d shown in FIG. 8. Accordingly, the operator pays attention to the x-coordinates A and B, and the y-coordinates C and D, however, the operator, in general, does not pay attention to the order of input of the coordinates data. Therefore, in some cases, x-coordinate data is given in the order of B and A, and y-coordinate data is given in the order of D and C. A CPU incorporated into the copying machine controls the timing of edit-copying operation matching with the movement of the copying paper. Accordingly, if the order of input of the coordinates data is wrong, the CPU is unable to specify the area, and hence edit-copying operation is impossible.

It is sometimes found when the area specified by giving data with a numeric keyboard is copied that the area of copied image is slightly different from the requested area. In such a case, according to Yagasaki et al., the operator must regive the four data with the numeric keyboard. Virtually this is very inconvenient.

SUMMARY OF THE INVENTION

It is a primary object of the present invention to provide an electrophotographic copying machine which enables the user to specify an edit-copying area with very simple work.

It is another object of the present invention to provide an electrophotographic copying machine capable of specifying an edit-copying area irrespective of the order of input of coordinates data.

It is a further object of the present invention to provide an electrophotographic copying machine which enables the user to finely adjust the provided data very easily.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

1. Copying Machine:

First, the mechanical constitution and the copying principle of a copying machine incorporating the present invention will be described.

Figure 1:
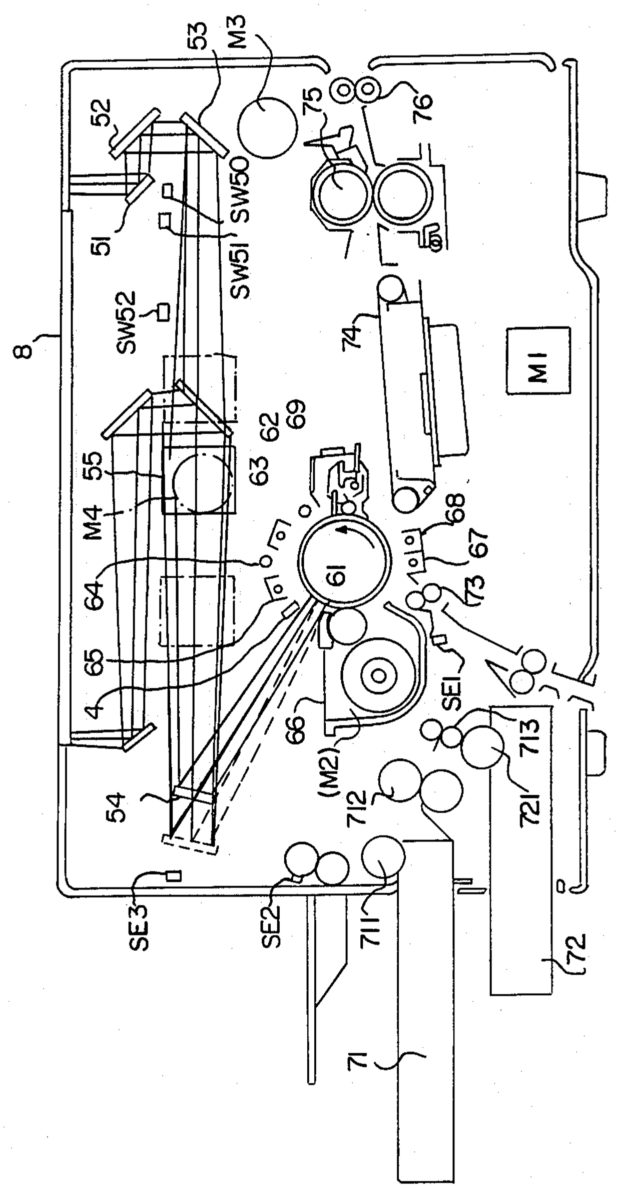
FIG. 1 is a schematic illustration showing the construction of an electrophotographic copying machine, in a preferred embodiment, according to the present invention.

FIG. 1 is a schematic illustration showing the construction of a copying machine embodying the present invention. The copying machine comprises a scanning system 5 (51 to 55), a copying unit 6 (61 to 69), a feed-delivery system 7 (71 to 76), and a contact glass 8 for supporting a document.

(a) Scanning System

The scanning system 5 is controlled by a second CPU, which will be described later. The scanning system 5 comprises a light source, not shown, mirrors 51, 52, 53, and 54, a lens 55 and a driving mechanism, not shown. The scanning system reciprocates along the lower surface of the contact glass 8 to scan the surface of a document optically during the scanning travel. The reflected light from the document is reflected by the mirrors 51, 52 and 53, then the reflected light travels through the lens (a variable-magnification lens block) 55, and then the reflected light is reflected by the mirror 54 to focus the image of the document on the surface of a photosensitive drum 61. The mirrors 51, 52 and 53 are driven correlatively by a single scanning motor M3. The traveling speed of the mirror 51 is V/N (V: circumferential speed of the photosensitive drum 61, N: copying magnification); the traveling speed of the mirrors 52 and 53 is V/2N in order that the optical path length is unvaried. On the other hand, the mirror 54 and the lens 55 are driven correlatively by a magnification setting motor M4. The lens 55 is moved along the optical axis to set a copying magnification, while the mirror 54 is moved and turned to correct the optical path length and the focusing point.

(b) Copying Unit

The copying unit 6 is controlled by a first CPU, which will be described later. The copying unit 6 comprises the photosensitive drum 61 capable of rotating in the direction of arrow, a main eraser lamp 62, a subcharger 63, a suberaser lamp 64, a main charger 65, a developing unit 66, a transfer charger 67, a copying paper separating charger 68 and a blade-type cleaning unit 69. The main eraser lamp 62, the subcharger 63, the suberaser lamp 64, the main charger 65, the developing unit 66, the transfer charger 67, the sheet separating charger 68 and the cleaning unit 69 are arranged around the photosensitive drum 61. An erase unit 4, which will be described later, is disposed between the main charger 65 and the developing unit 66 adjacent to the circumference of the photosensitive drum 61.

A photosensitive layer is formed over the circumference of the photosensitive drum 61. The photosensitive layer is charged and sensitized by the eraser lamps 62 and 64 and the chargers 63 and 65, and then an electrostatic latent image is formed to the photosensitive layer through slit exposure performed by the scanning system 5. No electrostatic latent image is formed in an area from which electric charge is erased prior to slit exposure by the erase unit 4. A toner adheres to the electrostatic latent image formed on the photosensitive layer in the developing unit 66, and then, a toner image thus produced is transferred to a copying paper, which is fed by a timing roller 73 of the feed-delivery system 7, by the transfer charger 67.

(c) Feed-delivery System

The feed-delivery system 7 is controlled by the first CPU. The feed-delivery system 7 comprises an upper sheet cassette 71, a lower sheet cassette 72, a feed roller 711 for the upper sheet cassette 71, a feed roller 721 for the lower sheet cassette 72, a pair of conveyor rollers 712 and 713, a pair of timing rollers 73, a conveyor belt 74, a fixing unit 75, and a pair of delivery rollers 76. These rollers are driven by a main motor M1.

2. Control Panel

Figure 2:
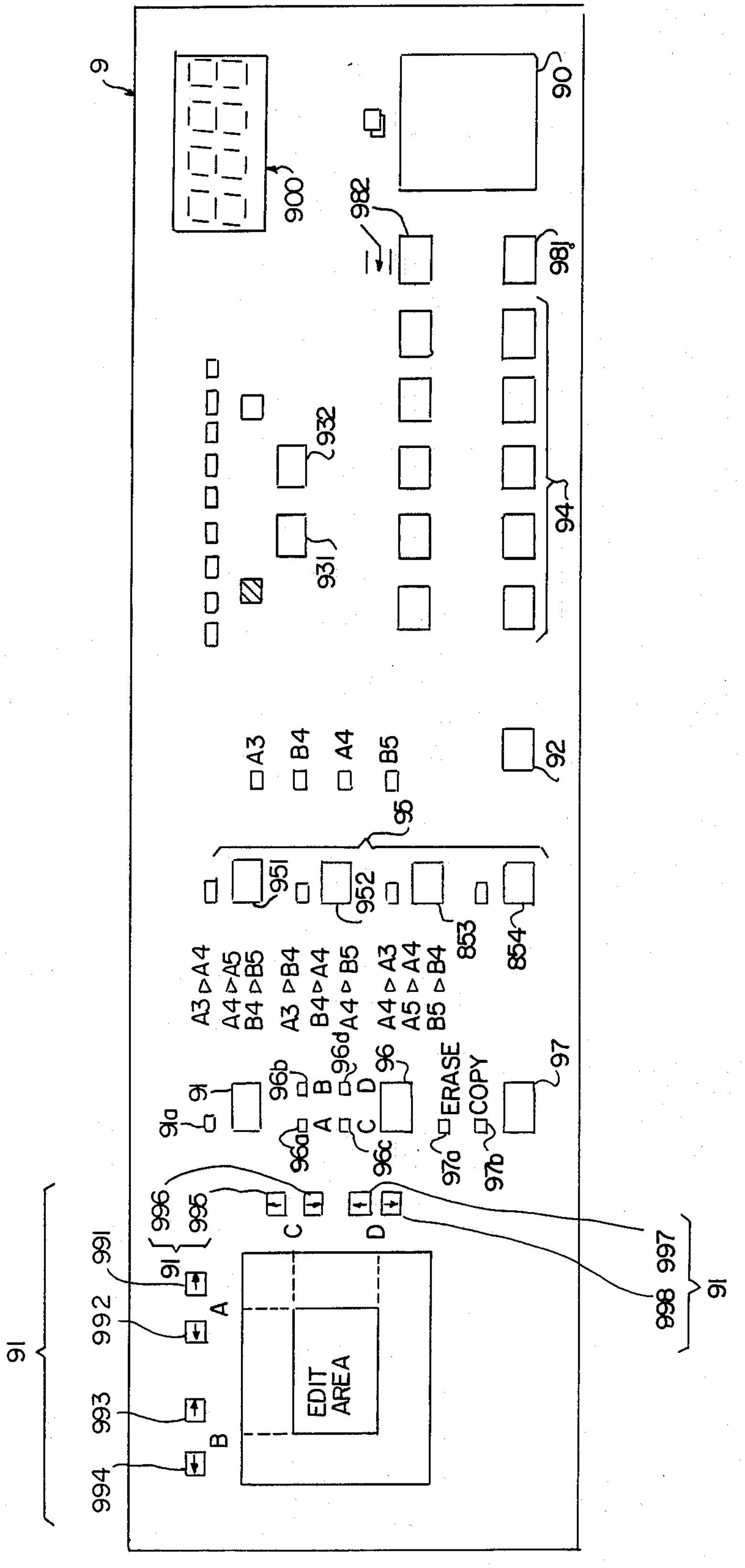
FIG. 2 is a plan view of the control panel of the electrophotographic copying machine of FIG. 1.

Keys and a display arranged on the control panel will be described hereinafter with reference to FIG. 2 showing the control panel 9 of the copying machine in a plan view.

The control panel 9 is provided with an arrangement of a print key 90 for starting the copying machine for copying operation, an edit copy select key 91, namely, a copy mode changeover key 91 for changing over copying mode, a copying paper selection key 92 for selecting either the sheet cassette 71 or the sheet cassette 72, an up-key 932 and a down-key 931 for varying copying density, numeric keys 94 corresponding to numerals 1,2, . . . , 9 and 0, respectively, for inputting the number of copies to be produced and the values of coordinates data, a magnification setting key group 95 (951 to 954) for setting one of preset copying magnifications, an edit coordinates select key (coordinates indicating key) 96 for requesting the indication of coordinates data on the display panel 900 in the order of A, B, C, and D, an erase-copy changeover key (erasing area changeover key) 97 for changing over the erase mode between an area erase mode and an area copy mode, a clear-stop key 981, an interruption key 982, a fine adjustment key group 99 (991 to 998) for the fine adjustment of the coordinates data, and a display panel 900 of the segmental digit type for displaying the number of copies or coordinates data.

In FIG. 2, small rectangles and triangles are LEDs serving as pilot lamp for indicationg that functions corresponding to the associated keys are effective.

3. Erase Unit

Figure 3:
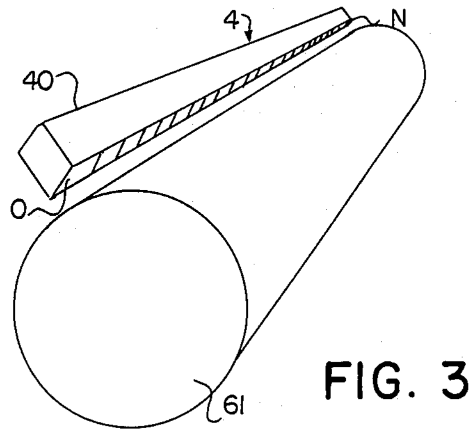
FIG. 3 is a perspective view showing the positional relation of an erase unit and a photosensitive drum.
Figure 4:
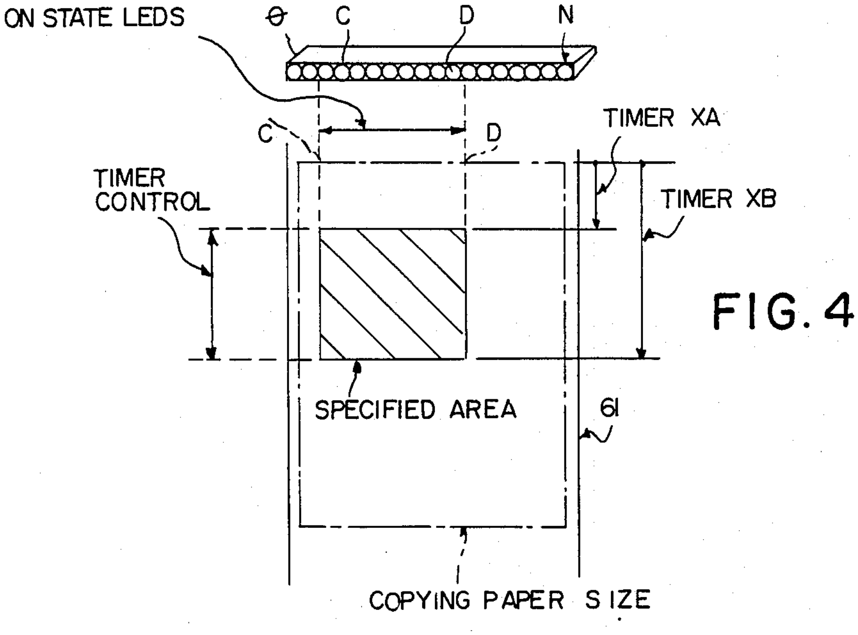
FIG. 4 is a diagrammatic illustration of assistance in explaining the relation between the erase unit and an erase area.

FIG. 3 is a perspective view of the erase unit 4 disposed adjacent to the photosensitive drum 61, and FIG. 4 is a diagrammatic illustration of assistance in explaining the manner of erasing the electric charge of a specified area by the erase unit 4.

The erase unit 4 has a LED array 40 including a row of a plurality (N+1 pieces) of LEDs. The LEDs are lighted selectively to erase the electric charge of the corresponding area on the photosensitive drum 61 so that no electrostatic latent image is formed in the area.

Suppose that the N+1 pieces of LEDs are designated by characters O to N from the left to the right as illustrated by way of example in FIG. 4. When the LEDs C to D are kept turned on from a time given by a timer XA to a time given by a timer XB, the electric charge in an area on the photosensitive drum 61 corresponding to a shaded area in FIG. 4 is erased; consequently, image corresponding to the area is not formed on a copying paper.

4. Control Unit

Figure 5:
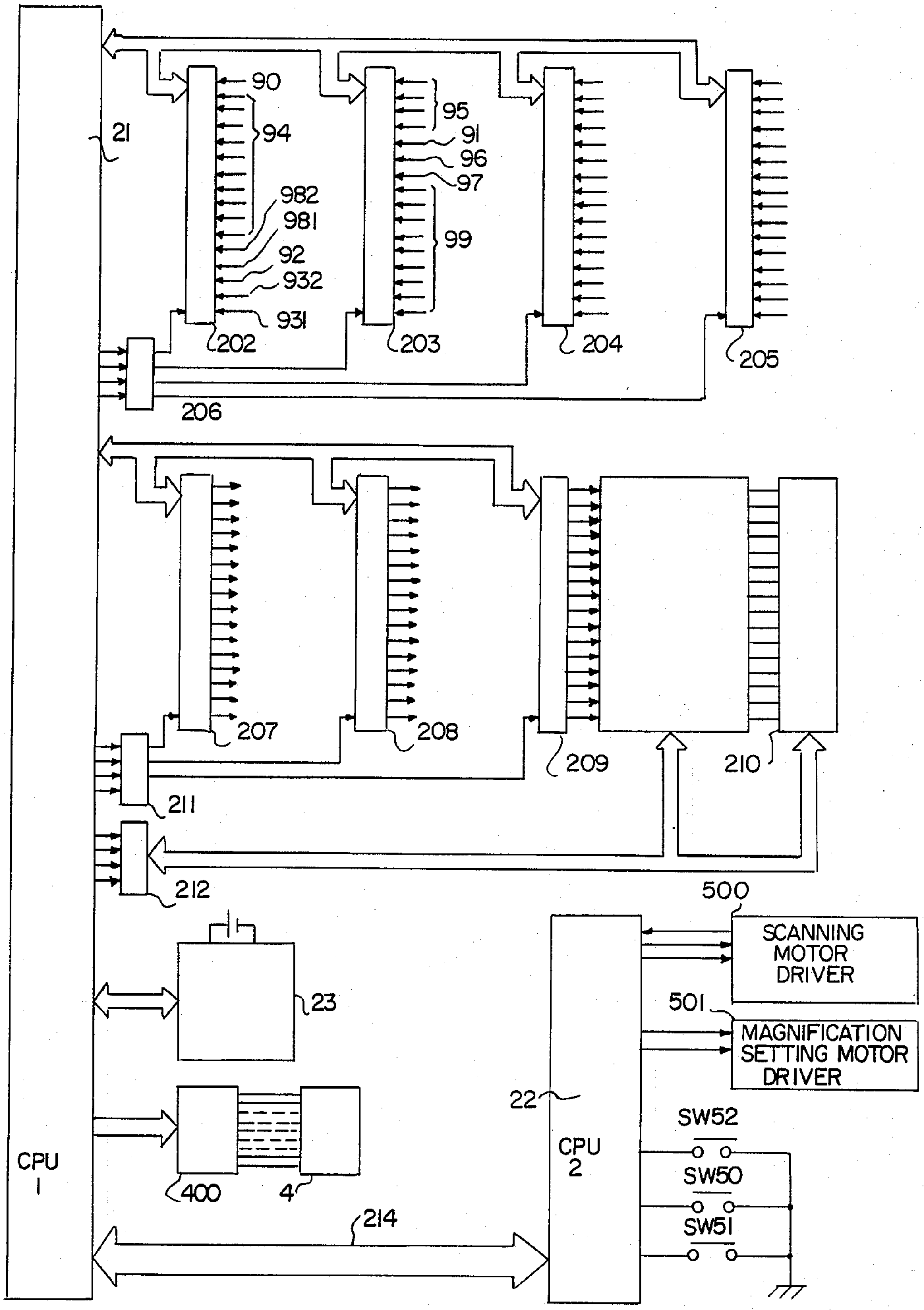
FIG. 5 is a block diagram showing the constitution of the control unit of the electrophotographic copying machine of FIG. 1.

FIG. 5 is a block diagram showing the constitution of a control unit incorporated into the copying machine. The control unit includes the first CPU 21, the second CPU 22 and RAM 23. In this embodiment, a driver circuit 400 for driving the erase unit 4 is connected to the first CPU 21. Although not shown in FIG. 5, a third CPU and/or fourth CPU may additionally be provided when an automatic document feeder (ADF) for automatically feeding documents, and/or a duplex unit for copying on both sides of a copying paper is incorporated into the copying machine, respectively.

Input extension ICs 202 to 205 are connected through a decoder 206 to the first CPU 21 and to the keys 90 to 998 of the control panel 9 and sensors provided in the feed-delivery system 7. Output extension ICs 207 to 209 are connected through a decoder 211 to the first CPU 21, the main motor M1, a development motor M2, and drivers for driving clutches respectively for the timing rollers 73, the delivery roller 711 and the delivery roller 721, the charger 65 and the transfer charger 67. Furthermore, the first CPU 21 is connected through a decoder 212 to the group 210 of the pilot LEDs.

The first CPU 21 controls the principal operations of the copying machine, such as driving the erase unit 4, the copying unit 6 and the feed-delivery system 7, and numerical indication on the display panel 900, according to key inputs and sensor inputs.

The second CPU 22 is connected to switches SW50 to SW52 of the scanning system 5, a driver circuit 500 for driving the scanning motor M3, and a driver circuit 501 for driving the magnification setting motor M4.

The second CPU 22 controls the operation of the scanning motor M3 and the magnification setting motor M4 in response to commands given thereto by the first CPU 21, and generates predetermined signals, such as timing signals, in response to sensor inputs given thereto by the sensors, such as an image front end switch of the scanning system and the like.

Various data, such as coordinates data, coordinates correction data, copying operation control data and magnification setting data, which are given by the control keys, sensors for detecting the operating conditions of the units and systems and a ROM of the CPU, are written in and read from the RAM 23.

5. Operation

The manner of operation of the copying machine thus constituted according to the present invention will be described hereinafter.

[A] General Description

Figure 6:
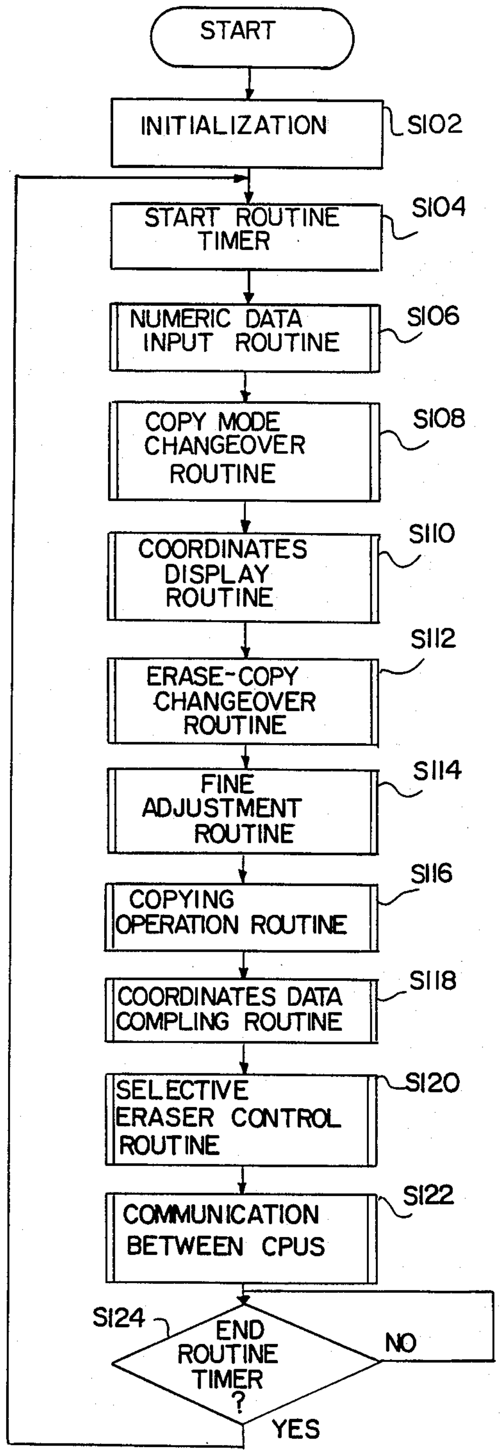
FIG. 6 is a flow chart showing the main routine of a first CPU 21.

FIG. 6 is a flow chart showing the main routine of the first CPU 21.

Upon the connection of a power source to the copying machine, the first CPU 21 starts the main routine. First, the first CPU 21 initializes the control unit (S102), and then sets a routine timer for regulating a time length for one routine (S104).

Then, subroutines of S106 to S122 are executed. These steps are described later. Outlines of these steps are as follows.

(1) S106

Numerical values given by means of the numeric keys 94 are stored in accordance with a copy mode. The numerical values are stored as coordinates data when the edit copy mode is selected, while the same are stored as the number of copies to be produced when the normal copy mode is selected.

(2) S 108

The copy mode is changed over when the copy mode changeover key 91 is pushed. For example, when the normal copy mode has been set before the copy mode changeover key 91 is pushed, the edit copy mode is set when the copy mode changeover key 91 is pushed, while on the contrary, when the edit copy mode has been set before the copy mode changeover key 91 is pushed, the normal copy mode is set when the copy mode changeover key 91 is pushed.

(3) S110

Coordinates data is displayed in response to inputting the edit coordinates select key 96 (coordinates display key). In this step when the edit copy mode is set, coordinates data A, B, C and D are displayed in order on the display panel 900 responding to the operation of the edit coordinates select key 96.

(4) S112

When the erase-copy changeover key 97 is pushed, the area erase mode or the area copy mode (outside the area erase mode) is set. When the erasecopy changeover key 97 is pushed in the edit copy mode, the portion to be erased is changed from the interior of the area to the exterior of the area or from the exterior of the area to the interior of the area.

(5) S114

The coordinates defining the copy area are corrected by operating the fine adjustment keys 991 to 998 of the fine adjustment key group 99 and the coordinates stored previously are changed for the corrected coordinates.

(6) S116

The copying machine starts the copying operation upon the depression of the print key 90.

(7) S118

This step is the essential part of the present invention. The given coordinates data is complied in increasing order and the compiled coordinates data is stored.

(8) S120

The electric charge of an area on the photosensitive drum 61 corresponding to the area to be specified is erased on the basis of the stored corrected coordinates data. No electrostatic latent image is formed in the area.

(9) S122

This step is communicating step. Interruption handling routine is executed to communicate with other CPUs including the second CPU 22 for controlling the scanning system 5 and, when provided, the third CPU for controlling the automatic document feeder (ADF) and the fourth CPU for controlling the duplex unit.

(10) S124

After those steps have been accomplished, the routine returns to S104 upon the elapse of the time set by the routine timer.

[B] Subroutines

Figure 7:
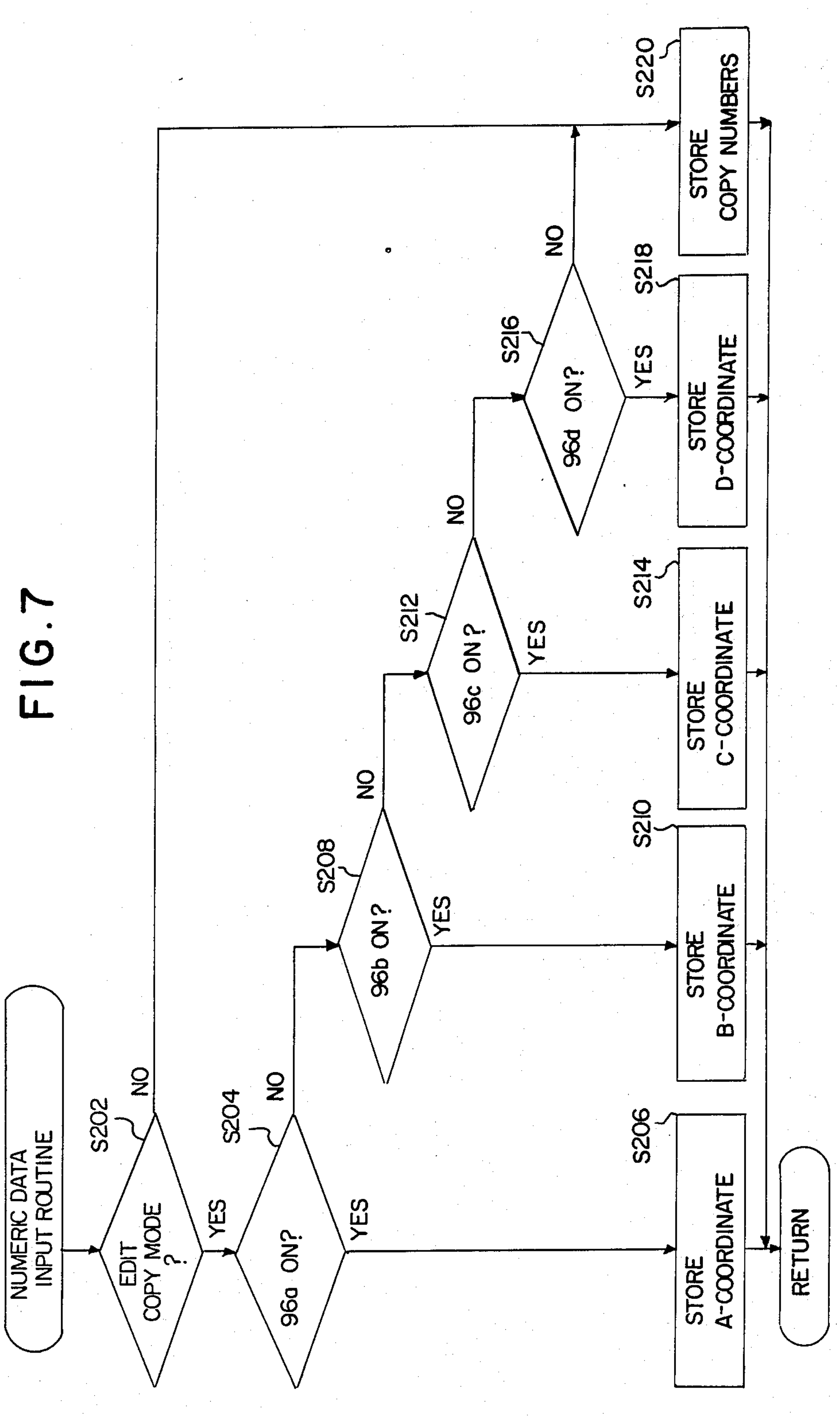
FIG. 7 is a flow chart showing the contents of step S106 of the main routine (numeric key input)
Figure 8:
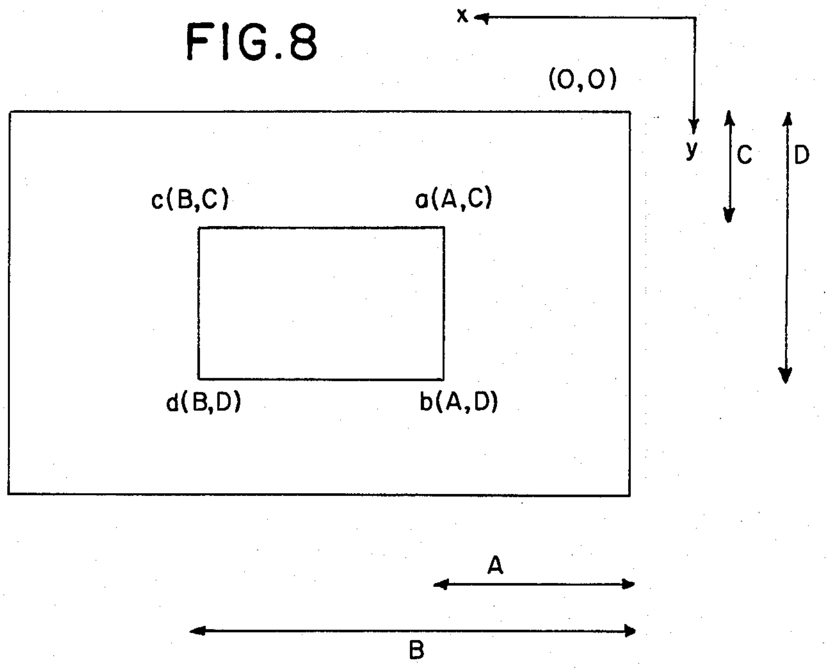
FIG. 8 is a diagrammatic illustration of assistance in explaining the relation between a copy area and coordinates data defining the copy area.

FIG. 7 is a flow chart showing the contents of S106 (numeric key operation), and FIG. 8 is a diagrammatic illustration of assistance in explaining the relation between a copy area and coordinates data defining the copy area.

Referring to FIG. 7, first a decision is made, at S202, as to whether the edit copy mode is selected or the normal copy mode is selected. This decision is made through a decision as to whether the edit copy mode indicator 91*a* is ON or OFF, more precisely, through the detection of a flag which is set to "1" when the edit copy mode indicator 91*a* is turned on and is set to "0" when the same is turned off.

When the edit copy mode is set, S204 to S218 are executed to store inputs given by means of the numeric keys 94 as coordinates data. The inputs given by means of the numeric keys 94 are stored as A-coordinate data (S206) when the A-coordinate indicator 96*a* is ON (S204), as B-coordinate data (S210) when the B-coordinate indicator 96*b* is ON (S208), as C-coordinate data (S214) when the C-coordinate data (S214) when the C-coordinate indicator 96c is ON (S212), and as D-coordinate data (S218) when the D-coordinate indicator 96d is ON (S216). The four points a, b, c and d defining the copy area or the erase area are represented by coordinates (A,C), (A,D), (B,C), and (B,D), respectively (FIG. 8). Supposing that the origin is at the upper right-hand corner of the copying paper, positive values for x are measured to the left on the x-axis extending leftward, and positive values for y are measured downward on the y-axis extending downward, A,B,C, and D are the x-coordinate of the points a and b, the x-coordinate of the points c and d, the y-coordinate of the points a and c, and the y-coordinate of the points b and d, respectively. In the copying machine, the copying paper advances in a direction corresponding to the negative direction of the x-axis, namely, the copying paper has a front edge on the right and advances rightward as viewed in FIG. 8.

When it is decided at S202 that the normal copy mode is selected, the routine goes to S220 to store the inputs given by means of the numerical keys 94 as the number of copies to be produced.

Figure 9:
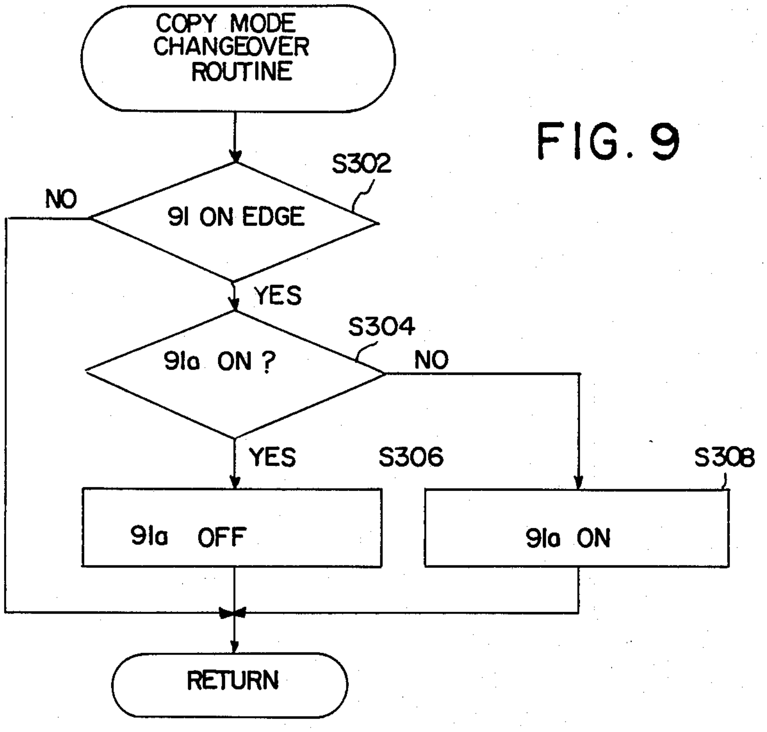
FIG. 9 is a flow chart showing the contents of step S108 (copy mode changeover) of the main routine.

FIG. 9 is a flow chart showing the contents of S108 (copy mode changeover routine). Upon the detection of an input given by means of the copy mode changeover key 91 by the first CPU 21(S302), the routine goes to S304 to make a decision as the present copy mode at the moment when the input is given by means of the copy mode changeover key 91. When the present copy mode is the edit copy mode, the routine goes to S306 to turn off the edit copy mode indicator 91aand to change the mode to the normal copy mode. On the other hand, when the decision at S304 is that the present copy mode is the normal copy mode, the routine goes to S308 to turn on the edit copy mode indicator 91aand to change the mode to the edit copy mode.

Figure 10:
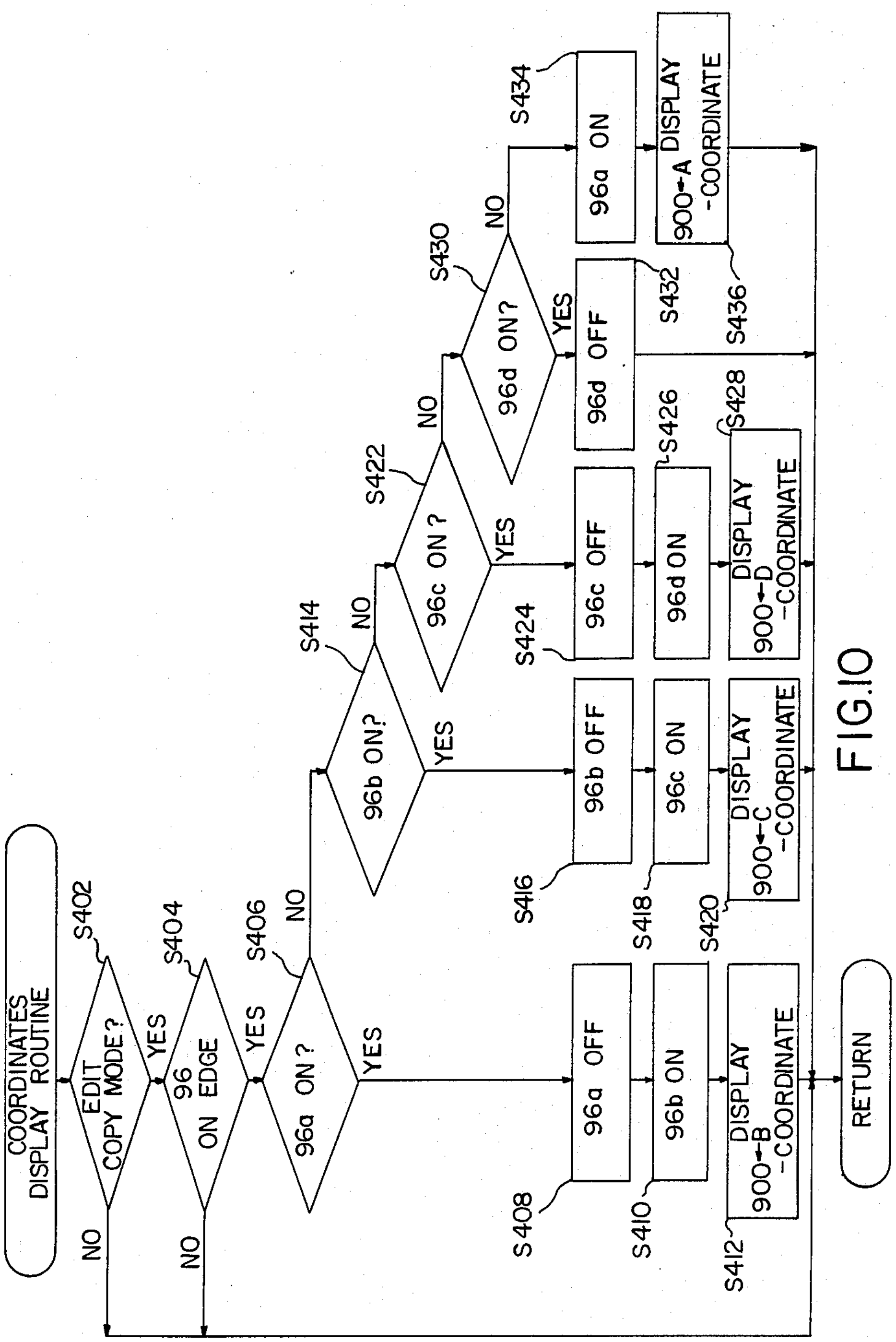
FIG. 10 is a flow chart showing the contents of step S110 (coordinates data display) of the main routine.

FIG. 10 is a flow chart showing the contents of S110 (coordinates data display routine). When the edit copy mode is set (S402), upon the detection of the inputs given by means of the edit coordinates select key 96 by the first CPU 21 (S404), the coordinates data stored in the memory is displayed on the display panel 900.

When none of the respective coordinate display request indicators 96a, 96b, 96c and 96d for the coordinates A, B, C and D is on state, the A-coordinate display request indicator 96a is turned on (S434), and then the A-coordinate data is displayed (S436). When the A-coordinate display request indicator 96a is on state (S406), the A-coordinate display request indicator 96a is turned off (S408), then the B-coordinate display request indicator 96b is turned on (S410), and then the B-coordinate data is displayed (S412). The C-coordinate data and the D-coordinate data are displayed in the same procedure (S414 to S432).

Figure 11:
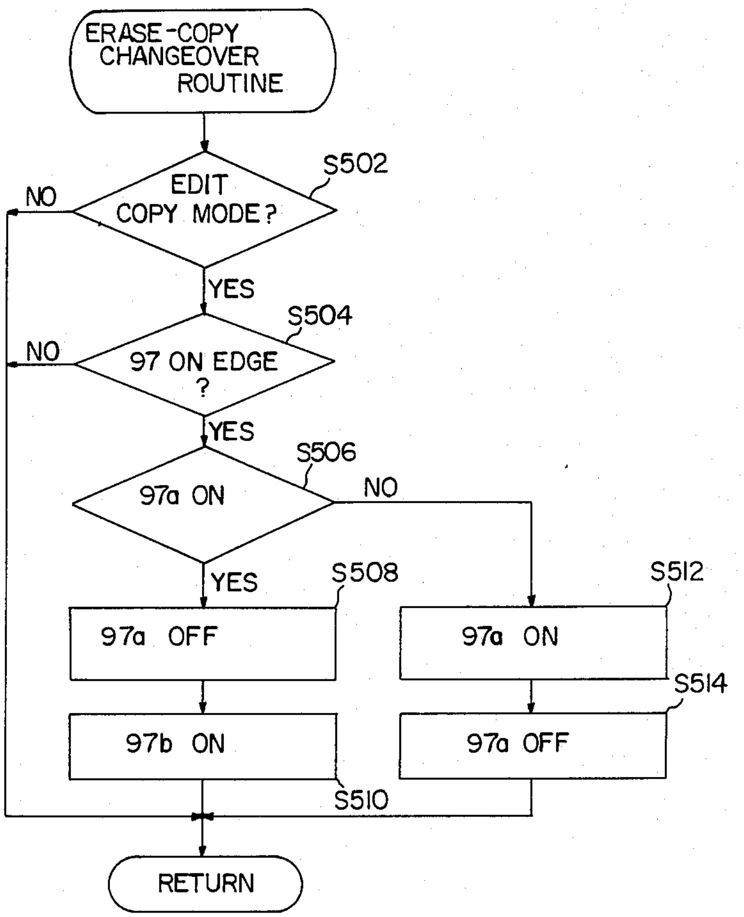
FIG. 11 is a flow chart showing the contents of step S112 (erase-copy changeover) of the main routine.
Figure 12:
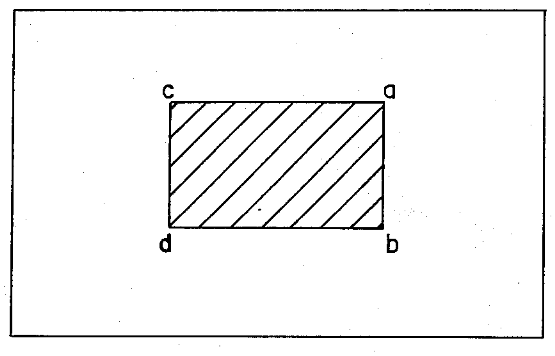
FIGS. 12 and 13 are diagrammatic illustrations of assistance in explaining erase-copy changeover operation.
Figure 13:
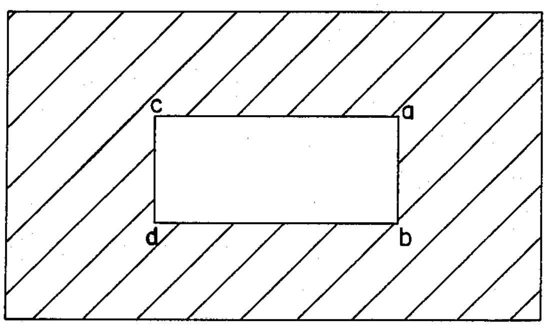

FIG. 11 is a flow chart showing the contents of S112 (erase-copy changeover routine) and FIGS. 12 and 13 are diagrammatic illustrations of assistance in explaining the erase-copy chageover routine.

Suppose that the edit copy mode is set at the present (S502). Then, when an input given by means of the erase-copy changeover key 97 is detected by the first CPU 21 (S504), a decision is made at S506 as to whether the area erase mode is set or the area copy mode is set. When the area erase mode indicator 97a. is on state, that is, when the area erase mode is set, the area erase mode indicator 97a is turned off (S508), then the area copy mode indicator 97b is turned on (S510), and then the mode is changed to the area copy mode. Thus, the exterior, a shaded portion in FIG. 13, of the area defined by points a, b, c, and d is erased. On the other hand, when a decision that the area erase mode indicator 97a is off state is made at S506, namely, when the area copy mode is set, the area erase mode indicator 97a is turned on (S512), then the area copy mode indicator 97b is turned off (S514), and then the mode is changed to the area erase mode. Thus, the area, shaded portion in FIG. 12, defined by the points a, b,c and d is erased.

Figure 14:
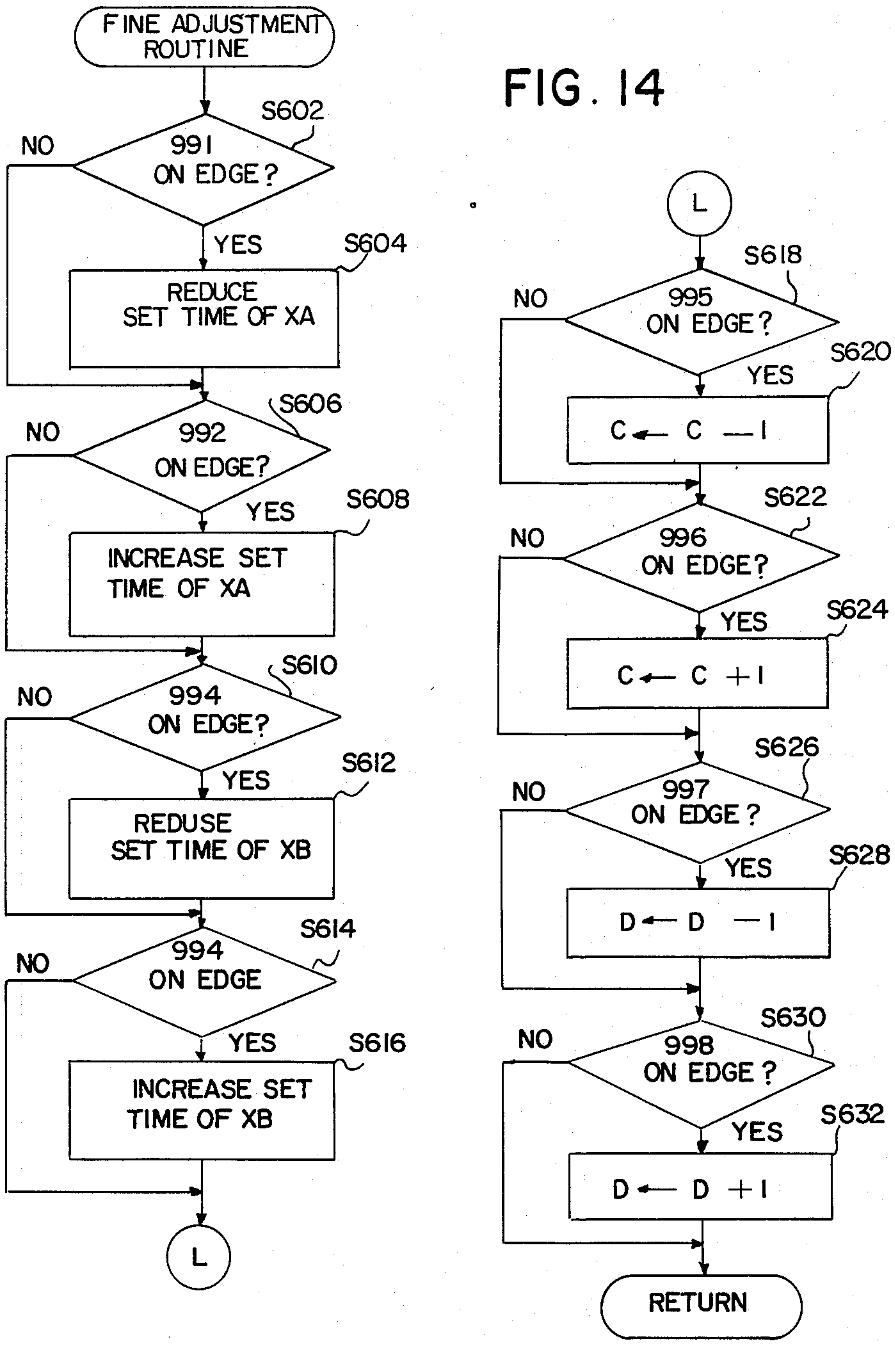
FIG. 14 is a flow chart showing the contents of step S114 (fine adjustment key group 99 (991 to 998) input operation) of the main routine.

FIG. 14 is a flow chart showing the contents of S114 (operation of the fine adjustment keys 991 to 998 of the fine adjustment key group 99).

S602 to S608 are steps for correcting the A-coordinate data. When the A-coordinate rightward adjustment key 991 is operated (S602), the time determined by the timer XA is reduced by a predetermined time length (S604). When the A-coordinate leftward adjustment key 992 is operated (S606), the time determined by the timer XA is increased by a predetermined time length (S608). The time Ta determined by the timer XA is expressed by:

$$Ta = A/Vp \qquad (1)$$

where Vp is copying paper conveying speed. That is, the time length Ta corresponds to the distance A from the front edge of the copying paper to a straight line connecting the points a and b (FIG. 8). That is, when the A-coordinate rightward adjustment key 991 is operated, the points a and b are shifted toward the front edge of the copying paper, namely, rightward as viewed in FIG. 8, by a unit distance corresponding to the predetermined time length, and when the A-coordinate leftward adjustment key 992 is operated, the points a and b are shifted in the opposite direction, namely, leftward a viewed in FIG. 8, by the unit distance.

The B-coordinate data is corrected in the similar manner through steps S610 to S616. When the B-coordinate rightward adjustment key 993 is operated (S610), the time determined by the timer XB is reduced by a predetermined time length (S612). When the B-coordinate leftward adjustment key 994 is operated (S614), the time determined by the timer XB is increased by a predetermined time length (S616). The time Tb determined by the timer XB is expressed by:

$$Tb = B/Vp \qquad (2)$$

The time length Tb corresponds to the distance B from the front edge of the copying paper to a straight line connecting the points c and d (FIG. 8). That is, when the B-coordinate rightward adjustment key 993 is operated, the points c and d are shifted toward the front edge of the recording sheet, namely, rightward as viewed in FIG. 8, by the unit distance, and when the B-coordinate leftward adjustment key 994 is operated, the points c and d are shifted in the opposite direction, namely, leftward as viewed in FIG. 8, by the unit distance.

The magnitude of the "unit distance" is discretionary; the unit distance is 1 mm in this embodiment.

S618 to S624 are steps for correcting the C-coordinate data. When the C-coordinate upward adjustment key 995 is operated (S618), the value of C is decreased by 1 (one) (S620), whereas the value of C is increased by 1 (one) (S624) when the C-coordinate downward adjustment key 996 is operated (S622). The C is a value corresponding to the distance from the upper edge of the copying paper to a straight line connecting the points a and c (FIG. 8). In this embodiment, as mentioned above, "C" represents the (C+1)th LED of the erase unit 4 from the top LED of the same. In this embodiment, since the LED are arranged at regular intervals of 5 mm, the points a and c are shifted upward or downward by 5 mm when the value of the C is decreased or increased by 1 (one).

The D-coordinate data is corrected in the similar manner through S626 to S632. When the D-coordinate upward adjustment key 997 is operated (S626), the value of the D is decreased by 1 (one) (S628), whereas the value of the D is increased by 1 (one) (S632) when the D-coordinate downward adjustment key 998 is operated (S630). The significance of the D is the same as the C. When the value of the D is reduced or increased by 1 (one), the points b and d are shifted upward or downward by 5 mm, respectively.

Figure 15A:
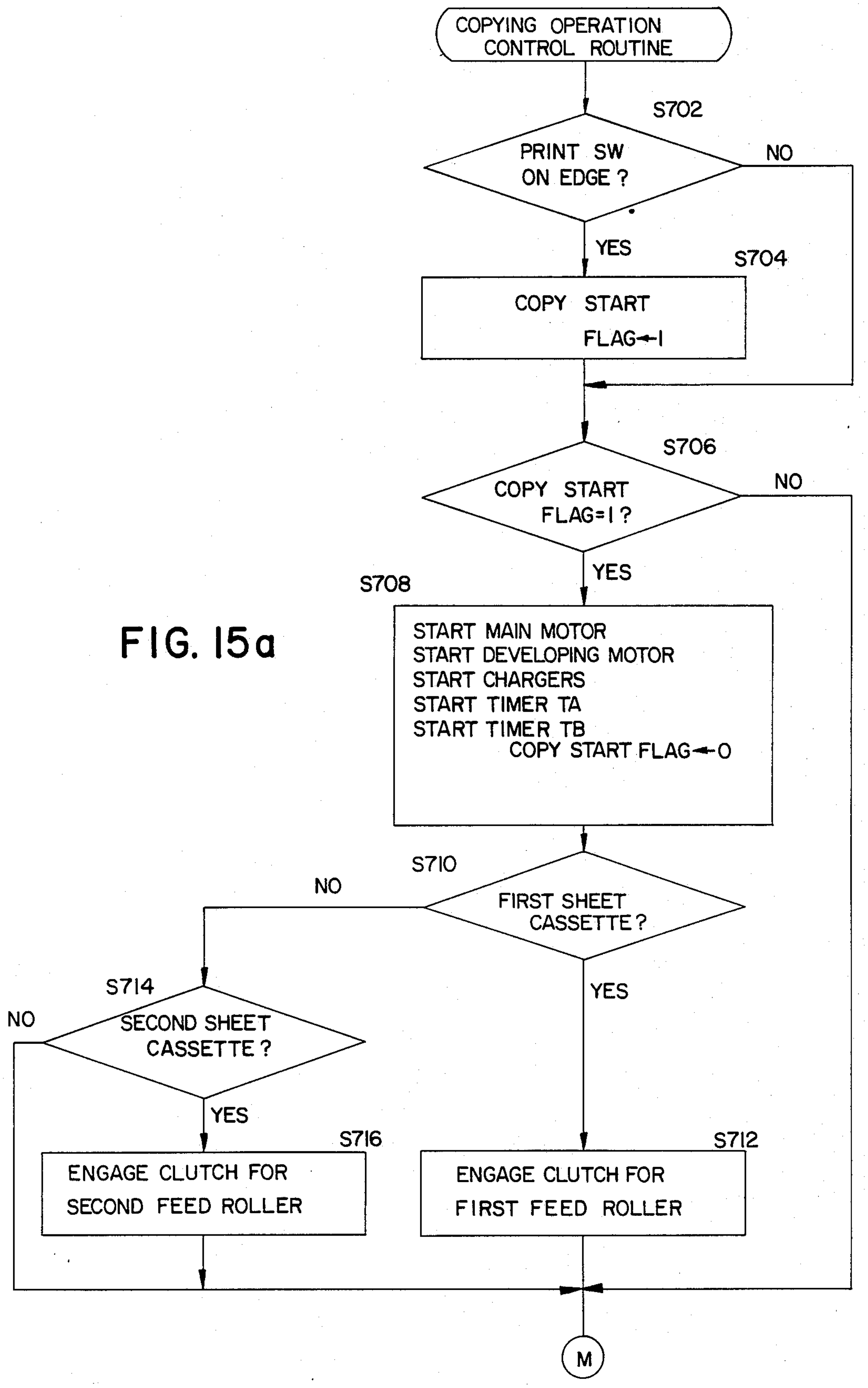
FIGS. 15(*a*) and 15(*b*) are flow charts showing the contents of step S116 (copying operation) of the main routine.
Figure 15B:
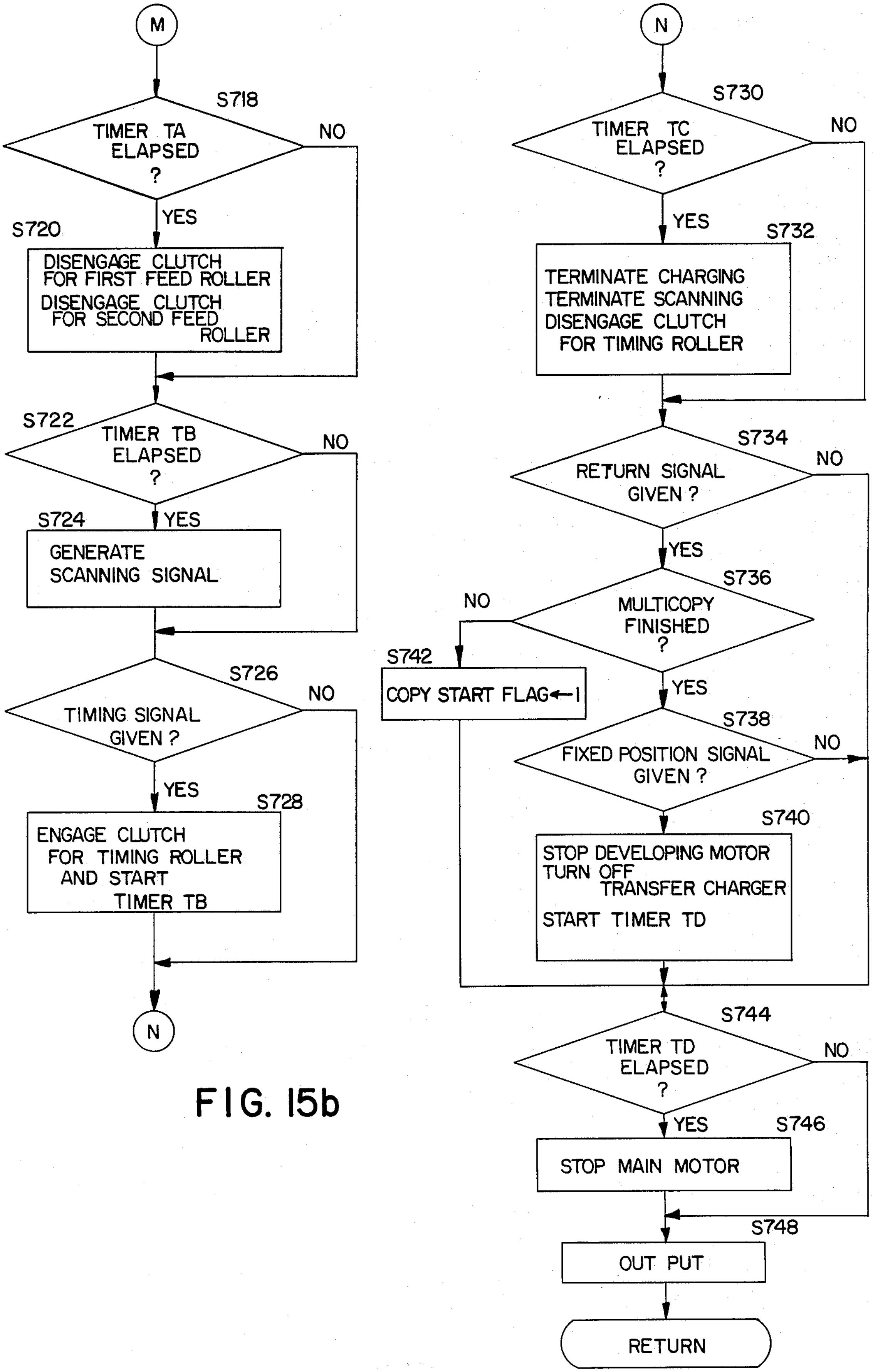

FIGS. 15(*a*) and 15(*b*) are flow charts showing the contents of S116 (copying operation).

When the print key 90 is operated (S702), copying operation control routine is started. First, a copy start flag is set to "1" (S704), then the flag is judged at S706. Then, the main motor M1, the developing motor M2, chargers 63 and 65 and the transfer charger 67 are actuated, the timers TA and TB are set and the copy start flag is set to "0" (S708). The timer TA determines the time at which the clutches for the feed rollers 711 and 721 are to be disengaged and the timer TB determines the time at which the scanning is started, respectively.

Either the upper sheet cassette 71 or the lower sheet cassette 72 is selected, and then the clutch for the feed roller 711 or 721 for the selected sheet cassette is engaged to start feeding a copying paper through the following steps S710 to S716.

Then, at S718 a decision is made as to whether or not the time determined by the timer TA is due and, when the decision is YES, the clutch for the feed roller 711 or 721 is disengaged (S720) to stop feeding the copying paper.

At S722, a decision is made as to whether or not the time determined by the timer TB is due and, when the decision is YES, a scanning operation start signal to be sent to the second CPU 22 is generated (S724). Upon the reception of the scanning operation start signal, the second CPU 22 starts predetermined scanning operation control routine.

At S726, a decision is made as to whether or not the second CPU 22 has given a timing signal. This timing signal is provided a predetermined time after the scanning system 5 which is controlled by the second CPU 22 has started optical scanning and the fixed position switch SW50 has been turned on.

Upon the detection of the timing signal, the first CPU 22 engages the clutch for the timing roller 73 to feed the copying paper between the photosensitive drum 61 and the transfer charger 67 to start transferring the toner image to the copying paper. At the same time, the timer TC is set (S728). The timer TC determines the time at which the scanning operation is terminated, charging is terminated and the clutch for the timing roller 73 is disengaged (S730,S732). The time interval determined by the timer TC is dependent on the size of the copying paper selected through S710 to S716, and on the set magnification of copying.

Then, at S734, a decision is made as to whether or not a return signal is provided by the second CPU 22. The return signal is provided when the scanning system 5 starts returning operation. Immediately after the return travel of the scanning system has been started (S734), multicopy operation has been accomplished (S736) and the second CPU 22 has provided a fixed position signal (S738) upon the arrival of the scanner, not shown, at a fixed position, the developing motor M2 and the transfer charger 67 are turned off, and then the timer TD is set (S740). The timer TD determines the time at which the main motor M1 is to be stopped (S744, S746). When it is decided at S736 that multicopy operation is not accomplished, a copy start flag is set to "1" (S742) to execute the copying cycle again.

At S748, the above-mentioned control signals are provided to control the external equipments and signals are transferred to other CPUs.

Figure 16:
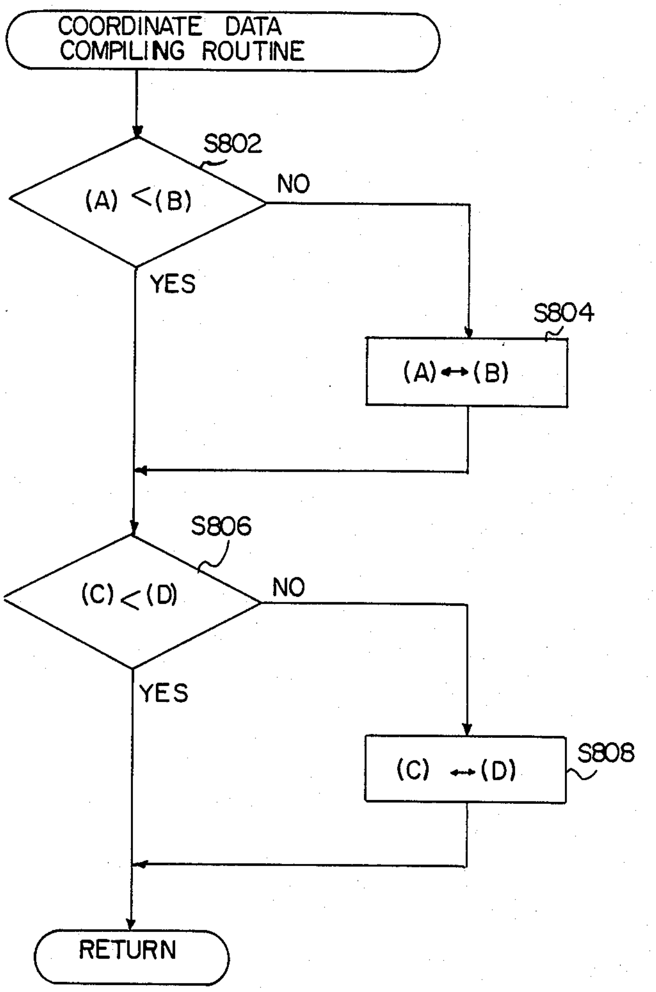
FIG. 16 is a flow chart showing the contents of step S118 (coordinates data compiling routine) of the main routine.

FIG. 16 is a flow chart showing the contents of S118.

At S802, X-coordinates A and B are compared in magnitude. When A>B, the routine goes to S804 to invert the order of the X-coordinates A and B. When A<B, the routine goes to S806 Y-coordinates C and D are compared in magnitude. When C>D, the routine goes to S808 to invert the order of the y-coordinates C and D. When C<D, the routine returns to the main routine.

Figure 17:
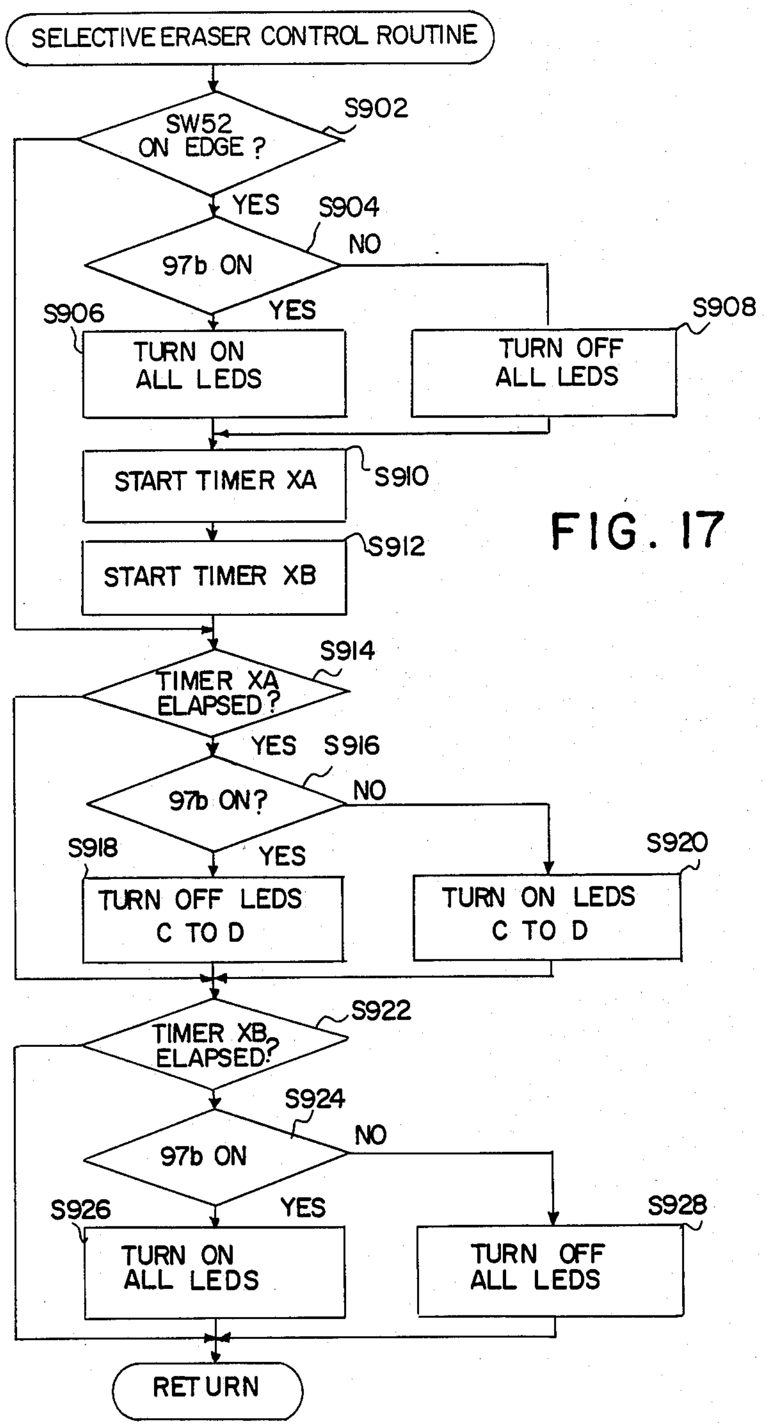
FIG. 17 is a flow chart showing the contents of step S120 (eraser control) of the main routine.

FIG. 17 is a flow chart showing the contents of S120 (eraser control).

When the scanning system 5 is operated under the control of the second CPU 22 and a signal is transferred from the second CPU 22 to the first CPU 21 when the image front end detecting switch SW52 is turned on (S902), a decision is made as to whether the area erase mode is selected or the area copy mode is selected (S904). That is, a decision is made as to whether or not the area copy mode indicator **97*b* is on state or not. When it is decided that the area copy mode is selected, the routine goes to S906 to turn on all the LEDs of the erase unit 4 and the timer XA and XB are set (S910, S912**). As mentioned above, a time determined by the timer XA corresponds to the distance A from the front edge of the copying paper to the straight line connecting the points a and b, while a time determined by the timer XB corresponds to the distance B from edge of the copying paper to the straight line connecting the points c and d.

After the time determined by the timer XA has elapsed (S914) and the area copy mode is selected (S916), the LEDs designated by codes C to D (C corresponds to the distance from the upper edge of the copying paper to the straight line connecting the points a and c, while D corresponds to the distance from the upper edge of the copying paper to the straight line connecting the points b and d) are kept turned off until the time determined by the timer XB elapses, while the rest of the LEDs are kept turned on (S918, S926).

Thus, when the area copy mode is selected, the electric charge of the area outside the area defined by the points a, b, c and d is erased and it is possible to form an electrostatic latent image in the area defined by the points a, b, c and d, as shown in FIG. 13.

On the other hand, when it is decided at S904 that the area erase mode is selected, the routine goes to S908 to turn off all the LEDs of the erase unit 4, and then the timers XA and XB are started (S910, S918). Then, only the LEDs for C to D are turned on after the time determined by the timer XA has elapsed until the time determined by the timer XB elapses (S920, S928). Thus, when the area erase mode is selected, the electric charge of the area defined by the points a, b, c, and d is erased, and hence it is possible to form an electrostatic latent image only outside the area defined by the points a, b, c, and d, as shown in FIG. 12.

Thus, the edit copying operation (copying operation for copying only a specified area in a document) of the electrophotographic copying machine embodying the present invention is carried out.

In the above-mentioned embodiment, finesse in specifying the width of an erase area in a direction perpendicular to the copying paper conveying direction is restricted by the size (5 mm) of the erasing LEDs. This restriction is removed by moving the entire LED array 40 in the perpendicular direction by a driving mechanism.

In the above-mentioned embodiment, the specified area having a length along the copying paper conveying direction, defined by the coordinates A and B is erased by controlling the timing of turning on and off the LEDs by means of the timers. It is also possible to control the timing of turning on and off the clutch for the timing roller 73.

Furthermore, in the above-mentioned embodiment, the coordinates data are compiled in increasing order, however, the coordinates data may be compiled in decreasing order if the control mode of the CPU requires.

In the foregoing description of the embodiment, no reference is made to the management of the corrected coordinates data, however, the corrected coordinates data may be stored in a memory for use in the next copying operation.

Still further, no reference is made to changing the copying magnification, well-known copying magnification changing means may be incorporated to the present invention.

The erase unit may be disposed after the exposure section and before the developing section. An erase unit for edit copying operation may be provided in addition to the erase unit.

As apparent from the foregoing description, the electrophotographic copying machine according to the present invention, for reproducing a specified area on a document on a copying paper is capable of specifying the specified area irrespective of the input sequence of the coordinates data specifying the area. Thus, the electrophotographic copying machine according to the present invention is capable of readily and surely carrying out so-called edit copying operation for copying only the specified area on a document.

Having now fully described the invention, it will be apparent to one of ordinary skill in the art that many changes and modifications can be made thereto without departing from the spirit or scope of the invention.

What is claimed is:

1. An electrophotographic copying machine comprising:

a table for setting a document;

scan means for scanning the document on said table;

means for inputting an arbitrary numerical value;

means for setting a first input mode in which the numerical value input by said input means is handled as first data to specify a first position in a first direction on said table;

means for setting a second input mode in which the numerical value input by said input means is handled as second data to specify a second position in the first direction on said table;

means for setting a third input mode in which the numerical value input by said input means is handled as third data to specify a first position in a second direction on said table, wherein said second direction is perpendicular to said first direction;

means for setting a fourth input mode in which the numerical value input by said input means is handled as fourth data to specify a second position in the second direction on said table;

memory means for storing data, said memory means having a first memory area for storing the first data, a second memory area for storing the second data, a third memory area for storing the third data, and a fourth memory area for storing the fourth data;

means for exchanging the first data and the second data in said memory means when the first data is greater than the second data;

means for exchanging the third data and the fourth data in said memory means when the third data is greater than the fourth data;

means for specifying an area on said table on the basis of the data stored in said memory means; and copying means for reproducing an image of the document corresponding to said specified area on said table.

2. An electrophotographic copying machine as claimed in claim 1, wherein said copying means comprises a photosensitive drum and electro static charge means for applying charge to the area on said photosensitive drum corresponding to said specified area.

3. An electrophotographic copying machine as claimed in claim 2, wherein said electro static charge means comprises:

a charger for applying charge over the whole circumference of said photosensitive drum; and means for erasing the electro static charge of an area exterior or interior to the area coresponding to said specified area on said photosensitive drum.

4. An electrophotographic copying machine as claimed in claim 3, wherein said electrostatic charge erasing means comprises a light emitting device capable of adjusting the width of light irradiation and the time of light irradiation at will.

5. An electrophotographic copying machine as claimed in claim 4, wherein said light emitting device is controlled with respect to the width of light irradiation and the time of light irradiation on the basis of the data stored in said four memory areas.

6. An electrophotographic copying machine comprising:

a table for setting a document;

scan means for scanning the document on said table;

means for inputting an arbitrary numerical value;

means for setting a first input mode in which the numerical value input by said input means is handled as first data to specify a first position in a first direction on said table;

means for setting a second input mode in which the numerical value input by said input means is handled as second data to specify a second position in the first direction on said table;

means for setting a third input mode in which the numerical value input by said input means is handled as third data to specify a first position in a second direction on said table, wherein said second direction is perpendicular to said first direction;

means for setting a fourth input mode in which the numerical value input by said input means is handled as fourth data to specify a second position in the second direction on said table;

memory means for storing data, said memory means having a first memory area for storing the first data, a second memory area for storing the second data, a third memory area for storing the third data, and a fourth memory area for storing the fourth data;

adjusting means for minutely and independently varying the data stored in each memory area respectively without using said numerical value input means;

means for specifying an area on said table on the basis of the data stored in said memory means; and copying means for reproducing an image of the document on said table corresponding to said specified area.

7. An electrophotographic copying machine as claimed in claim 6, wherein said copying means comprises a photosensitive drum and electro static charge means for applying charge to the area on said photosensitive drum corresponding to said specified area.

8. An electrophotographic copying machine as claimed in claim 7, wherein said electro static charge means comprises a charger for applying charge over the whole circumference of said photosensitive drum and a means for erasing the electro static charge of the area exterior to the area corresponding to said specified area on said photosensitive drum.

9. An electrophotographic copying machine as claimed in claim 8, wherein said electro static charge erasing means comprises a light emitting device capable of adjusting the width of light irradiation and the time of light irradiation at will.

10. An electrophotographic copying machine as claimed in claim 9, wherein said light emitting device is controlled with respect to the width of light irradiation on the basis of the data stored in said memory means and with respect to the time of light irradiation on the basis of the data stored in said memory means.

11. An electrophotographic copying machine as claimed in claim 9, wherein said light emitting device is controlled with respect to the width of light irradiation on the basis of the data stored in said memory means before adjustment by said adjusting means, changed with respect to the positions on the basis of a data stored in said memory means after an adjustment by said adjusting means, and controlled with respect to the time of light irradiation on the basis of the data stored in said memory means after the adjustment by said adjusting means.

12. An electrophotographic copying machine as claimed in claim 10, wherein said input means provides numerical data.

13. An electrophotographic copying machine as claimed in claim 12, wherein said adjusting means selectively increases and decreases said numerical data stored in said memory means by a predetermined value.

14. An electrophotographic copying machine as claimed in claim 13, wherein said adjusting means comprises an increasing key for increasing stored numerical data by a predetermined step and a decreasing key for decreasing stored numerical data by a predetermined step.

15. An electrophotographic copying machine comprising:

a table for setting a document, input means for providing numerical data, means for specifying an area on said table on the basis of the numerical data provided by said input means, means for finely adjusting a region of said area independent of said numerical data input means, and copying means for reproducing an image of the document corresponding to said area finely adjusted by said finely adjusting means.

16. An electrophotographic copying machine capable of an editing function, for optically scanning a document to form an electrostatic latent image on a photosensitive member, developing the electrostatic latent image with a toner, and transferring the toner image to a copying paper to reproduce the image of the document, which comprises:

input means for providing orthogonal coordinate data representing a specified area in the document;

operating and memory means for comparing the respective magnitudes of x-coordinate data and y-coordinate data of the orthogonal coordinate data, compiling the x-coordinate data and the y-coordinate data in order of magnitude, and storing the compiled data; and electric charge erasing means for erasing the electric charge of an area on the photosensitive member corresponding to the specified area in the document before developing, on the basis of the compiled data stored in the operation and memory means.

17. An electrophotographic copying machine capable of an editing function as claimed in claim 16, which further comprises:

correction data input means for providing correction data relating to said specified area; and correcting control means for correcting said stored data on the basis of the correction data upon the reception of the correction data, and replacing said stored data with the corrected data.

* * * * *